United States Patent [19]

Koelmans

[11] Patent Number: 4,797,676
[45] Date of Patent: Jan. 10, 1989

[54] SURVEILLANCE RADAR SYSTEM

[75] Inventor: Norbert Koelmans, Germering, Fed. Rep. of Germany

[73] Assignee: Siemens Aktiengesellschaft, Berlin and Munich, Fed. Rep. of Germany

[21] Appl. No.: 72,392

[22] Filed: Jul. 13, 1987

[30] Foreign Application Priority Data

Aug. 1, 1986 [DE] Fed. Rep. of Germany ....... 3626035

[51] Int. Cl.⁴ .......................... G01S 7/08; G01S 7/22; G06F 15/626; G09G 1/14
[52] U.S. Cl. .................................. 342/176; 342/177; 342/182; 342/185; 340/717; 340/734; 364/521
[58] Field of Search ................ 342/177/182, 176, 185; 340/717, 734; 364/521

[56] References Cited

U.S. PATENT DOCUMENTS

| 3,403,391 | 9/1968 | McCown | 342/182 |
|---|---|---|---|
| 3,900,846 | 8/1975 | Gibbon et al. | 342/182 |
| 4,120,028 | 10/1978 | Membrino et al. | 364/200 |
| 4,209,832 | 6/1980 | Gilham et al. | 340/734 X |
| 4,521,014 | 6/1985 | Sitrick | 273/16 C |

Primary Examiner—T. H. Tubbesing
Assistant Examiner—Gilberto Barrón, Jr.
Attorney, Agent, or Firm—Hill, Van Santen, Steadman & Simpson

[57] ABSTRACT

A surveillance radar system which has a display processor 1 that receives graphic data from a computer 4 which are edited and divided according to target data and console associated data or background information data and which is edited in two arithmetic logic units 2 and 3 and in response to a console request are combined after being edited and are supplied to output interfaces A, B, C and D and forwarded for transmission to picture screen consoles through refresher channels connected to the output interfaces. The invention is provided for the utilization in surveillance radar systems covering large areas and using a large number of picture screen console.

7 Claims, 2 Drawing Sheets

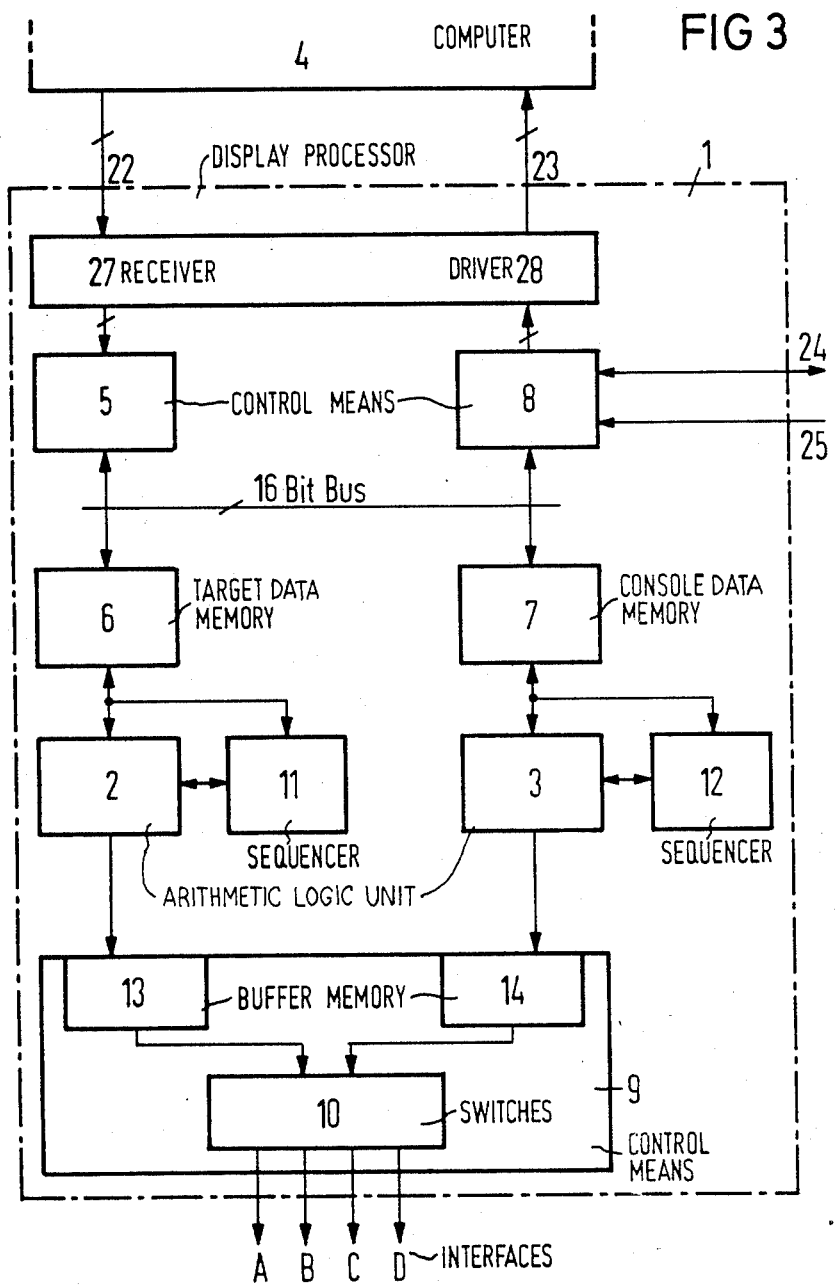

SURVEILLANCE RADAR SYSTEM

BACKGROUND OF THE INVENTION

1. Field of the Invention

The invention relates to a surveillance radar system utilizing a plurality of picture screens which are mounted in consoles wherein different graphics data can be selected and uses a display processor which receives graphics data particularly target data, console associated data, background information data in the form of line circles, texts, traces or alarm reports and an interface test data from a computer and the data is edited depending on the requirements of the individual consoles and after editing are forwarded through a plurality of output interfaces through refresh channels to the console picture screens for display.

In the system of the invention, a display processor is utilized which edits all supplied data, in other words, both the target data as well as the console associated data and background information data in a computer unit and then forwards them in ordered form through refresh channels to the picture screen consoles.

2. Description of the Prior Art

The processing of the target data is extremely critical time wise. In a surveillance radar system being used, for example, up to about 2000 target data coordinates must be transmitted in about 87 msec and these are converted for all connected picture screen consoles, for example, ten consoles according to the respectively individually set picture details scale and decentering. Among the things that are included in this recalculation are a coordinate transformation and detail filtering. Console associated data and background information data are in fact only rarely transmitted. When a change in the background information occurs this can be initiated by pressing a key at one of the consoles. However, the completely existing information must be processed. So as to maintain the reaction time of the system very short, particularly given simultaneous changes at a plurality of consoles fast processing is required.

The number of connectible picture screen consoles and the data transfer capability of the data coming from the computer is very limited in the existing surveillance radar systems.

SUMMARY OF THE INVENTION

It is an object of the present invention to provide a display processor such as in a surveillance radar system where more consoles can be connected as compared to prior art systems and the data transfer capability can alo be enhanced.

This object is achieved in the invention in that two arithmetic logic units are operated in parallel and are provided in the display processor with one editing the target data and the other editing the console associated data and background information data and the data transfer from the computer to the arithmetic logic unit is carried out by a separate control means at the input side which additionally first undertakes a storing of the target data in a target data memory associated with the logic unit for processing the target data and secondly undertakes a storing of the console associated data and background information in a console data memory before the logic unit for processing these data and a separate control means is provided for processing information between the arithmetic logic units and the individual consoles. The separate console means, in particular, assures that the console status words, for example, current settings of the scale and decentering of all consoles, are available in both data memories for the coordinate transformation and a control means comprising an electronic switch for driving the output interfaces associated to the refresh channels is provided in the display processor at the output and these output interfaces are supplied with the data edited in the target data logic and in the console data logic unit and such data is output in coordinated form through the respective refresh channels.

The division of the display processor into two arithmetic logic units and the employment of the control means produces a shorter overall calculating time since both arithmetic logic units can separately edit the data respectively allocated to them and can simultaneously edit them independently of each other. With the display processors used in prior art system by contrast, a conflict results in the allocation of computer time since everything must be processed in the single computer unit, particularly since it must be considered that the target data having priority over the remaining data in the processing and in case of an overload editing procedures of background information data which, for example, may already have been initiated or interrupted and must be restarted at a later time. With the display processor according to the invention, the graphic data which differs in terss of type and which are separately calculated as such are not combined until after the computional editing and sorting so that a time conflict can only arise in the transmission at the interface to the refresh channels such as when that refresh channel that, for example, just happens to be used for target data must also be used to supply background information data. Also, a separation is possible when in such an instance, the data just arising in the control means at the output side which are to be allocated to a different refresh channel are forwarded to the particular channel. Advantageous coordination on the basis of waiting and ordering can be implemented in the control means in nearly every operational case.

So as to supply the refresh channels in an advantageous manner, a first buffer memory, for example, in the form of a FIFO (first-in, first-out) memory or RAM memory is provided in the control means at the output side for the edited target data and an identical, second buffer memory is provided for the edited console associated data as well as for the background information data and these prevent one and the same refresh channel from being simultaneously supplied by first target data associated to the channel and second, console associated data or respectively, background information data. The two buffer memories thus also allow the data editing in the arithmetic logic units not to be blocked.

The two arithmetic logic units and two sequencers associated with the two logic units and which cause the execution of a specific microprogram in the respective logic unit are each a component part of a fast bipolar 16 bit microprocessor system which can be fashioned identical and have the same hardware for both logic unit which is advantageous.

When using a 16 bit microprocessor, the control means at the input side can then be equipped with a data format conveter which converts 32 bit data format of the computer to 16 bits.

Alarm reports in the display processor are forwarded by way of a serial interface directly to the respectively address console, in contrast where interface test data are transmitted back to the computer.

Other objects, features and advantages of the invention will be become apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 3 is a block circuit diagram of a display processor according to the invention and including its control means.

DESCRIPTION OF THE PREFERRED EMBODIMENTS

Figure 1:
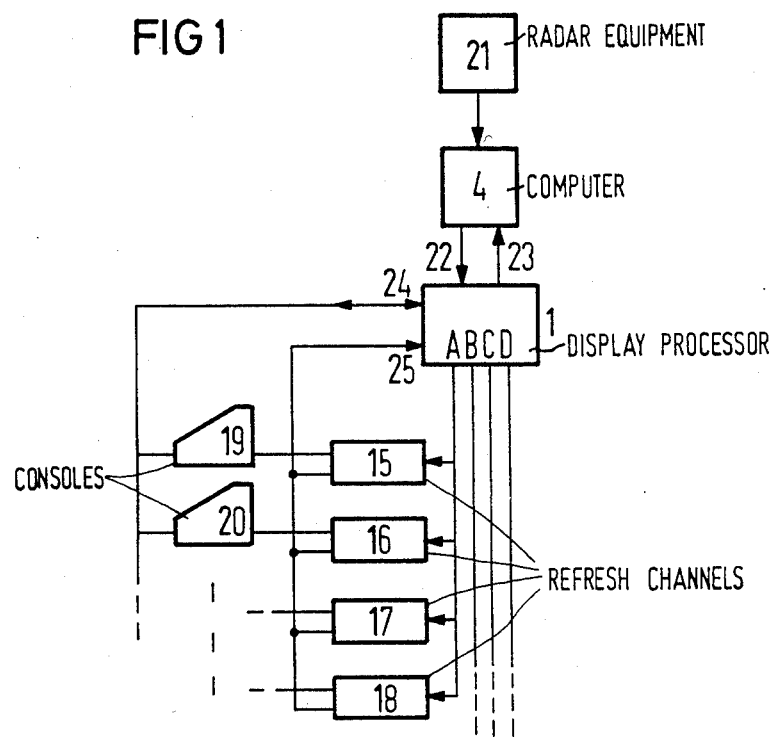
FIG. 1 is a block circuit diagram of a surveillance radar system for large areas and comprising a display processor and a plurality of picture screen consoles.

A large area surveillance radar system is shown in FIG. 1 and is composed of a radar equipment 21 which produces target information which is supplied to a computer 4 for further processing and for generating corresponding graphics data. This computer 4 also generates further graphics data such as line, circles, texts, traces for the background information, target labelling and other identifications and console addressed form. A display processor 1 receives the graphics data from the computer 4 and executes calculations using this data. The display processor sends the edited data by way of output interfaces A, B, C and D to respectively up to four refresh channels 15, 16, 17 and 18 per output interface so as to make the graphics data visible on the maximum of 16 picture screens, respectively, accommodated in consoles 19 and 20. Details of this system are shown in FIGS. 2 and 3.

Figure 2:
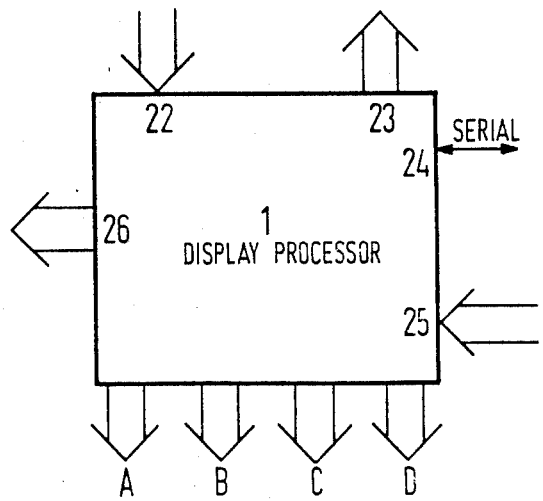
FIG. 2 is the basic diagram of a display processor used in the system of FIG. 1 and showing its interfaces.

FIG. 2 illustrates a display processor 1 with its interfaces used in the system. In the application, the data coming from the computer 4 and supplied to the interface 22 can be divided into four following groups. The first group are the target data, in other words, the momentary target data and the chronologically preceding target data. The second group are what are referred to as the console data, in other words, the console associated data and the background information data such as lines, circles, texts and traces. The third group of data is composed of alarm reports and the fourth group is composed of interface test data. One interface 23 serves the purpose of returning data and reports to the computer 4. The transmission of information between the display processor 1 and the individual consoles occurs serially by way of an interface 24. The target data edited in the display processor 1, the console associated data and the background information data are supplied by way of the output interfaces A, B, C and D to the refresh channels connected to the consoles. From these refresh channels, input text information can also be supplied to the display processor 1 by way of an interface 25. The interface 25, however, is of little significance in the present invention and this is also true of the interface 26 which supplies test points for the test signals. The computer 4 which is connected to the interfaces 22 and 23 operates with a word format of 32 bits.

Alarm reports are directly forwarded by way of the serial interface 24 to the respectively address console and the interface test data merely have to be transmitted back to the computer 4, in other words, they pass from the interface 22 by way of the display processor 1 to the interface 23.

FIG. 3 shows the construction of a display processor 1 according to the invention in block diagram form. A time optimized processing of graphic data supplied from the computer 4 is assured with a display processor 1 formed in this manner. A receiver 27 is connected to the interface 22 which accepts the graphic data coming from the computer 4. In contrast, the signals output to the computer 4 are supplied to the interface 23 by way of a driver 28. The processing of the graphics data coming from the receiver 27 is executed with two fast bipolar 16 bit microprocessors, each of which is respectively composed of an arithmetic logic unit 2 and 3 and of a sequencer 11 and 12 which cause the execution of a specific microprogram. The two arithmetic logic units 2 and 3 with their sequencers 11 and 12 simultaneously operate as independently as possible from one another. The logic unit 2 thus processes the target data and the logic unit 3 processes what are referred to as the console data, in other words, the console associated data and the background information data. The logic units 2 and 3 and the two sequencers 11 and 12 may be formed of identical hardware.

The data transfer from the computer 4 to the display processor is executed by a separate control means 5 which additionally undertakes a contents related data format conversion from 32 bits which is the data format of the computer 4 to 16 bits which is the data format of the logic units 2 and 3, and also causes storing of the graphics data into corresponding data memories which are a target data memory 6 and a console data memory 7 which are supplied by the control means 5. The processing of information between the display processor 1 and the individual console terminals at the interface 24 is separately controlled with a control means 8. This control means 8 particularly assures that console status words, for example, current settings of the scale and decentering of all the consoles are available for coordinate transformation in the two memories 6 and 7. A control means 9 at the output of the arithmetic units 2 and 3 assures that the edited target data and console data are supplied as output through the four output interfaces A, B, C and D to the refresh channels 15-18 when that refresh channel that would have to be supplied with background information data at the same minute is, for example, occupied by the target data. Also, a separation is possible when data just occurring allocated to a different refresh channel is forwarded to this refresh channel in the control means 9 at the output. In such a case, an advantageous coordination can be made in the control means 9 by waiting and ordering at any operating time. In addition to the switches 10 which make the through-connection of the data to the interfaces A, B, C and D, the control means 9 also includes a first buffer memory 13, for example, in the form of RAM memory or in the form of a FIFO memory for the edited target data and an identical second buffer memory 14 for the edited console associated data as well as for the background information data. The two buffer memories 13 and 14 prevent the same refresh channel from being simultaneously supplied by first target data associated to such channel and second console associated data or respectively background information data and they also assure that the data editing in the arithmetic logic units 2 and 3 is not blocked.

Thus, the information is supplied from the computer 4 through receiver 27 control means 5 and the two memories 6 and 7 to the refresh memories through the control means 9 including the buffer memories 13 and 14 and the switches 10.

Although the invention has been described with respect to preferred embodiments, it is not to be so limited as changes and modifications can be made which are within the full intended scope of the invention as defined by the appended claims.

I CLAIM AS MY INVENTION:

1. A surveillance radar system comprising, a plurality of picture screens mounted in consoles and selectable to display different graphics data from a display processor which receives graphics data, such as target data, console-associated data, background information data in the form of lines, circles, texts, traces or the like, alarm reports and interface test data from a computer and edits these data upon receipt of individual console requests, and, after editing, forwards them by way of a plurality of output interfaces which are referred to as refresh channels to the console picture screens for display, characterized in that first and second arithmetic logic units (2, 3) operated in parallel are provided in the display processor (1), said first logic unit (2) editing the target data and said second logic unit (3) editing the console-associated data and background information data; the data transfer from the computer (4) to the arithmetic logic units (2, 3) is executed by a separate control means (5) which stores the target data in a target data memory (6) connected to input of said first logic unit (2) for processing the target data and storing the console-associated data and background information data in a console data memory (7) connected to input of said second the logic unit (3) for processing these data; a separate control means (8) is provided for processing information between aid first and second arithmetic logic units (2, 3) and said individual consoles, said separate control means (8) assuring that console status words, for example, current settings of scale and decentering of all consoles are available in said target and said console data memories (6, 7) for coordinate transformation; and a third control means (9) provided at the output side in said display processor (1), said third control means (9) comprising an electronic switch (10) for driving the output interfaces (A, B, C, D) allocated to the refresh channels, output interfaces being supplied with the data edited in said target data first logic unit (2) and in said console data second logic unit (3) and said output interfaces providing these data in coordinated form for forwarding to the respective refresh channels.

2. A surveillance radar system according to claim 1, characterized in that said first and second arithmetic logic units (2, 3) each have first and second sequencers (11, 12) associated with them, and said first and second sequencers assuring the execution of a specific microprogram in the associated first and second logic units.

3. A surveillance radar system according to claims 1 or 2, characterized in that each of said first and second arithmetic logic units (2, 3) and the respectively allocated first and second sequencers (11, 12) are components of a fast bipolar 16 bit microprocessor and are identically constructed.

4. A surveillance radar system according to claims 1 or 2, characterized in that said control means (5) at the input side contains a contents-related data format converter which for example, converts the 32 bits of output of the computer (4) into 16 bits for the said first and second logic units (2, 3).

5. A surveillance radar system according to claims 1 or 2, characterized in that a first buffer memory (13), for example, in the form of a first FIFO first in-first out memory or RAM memory is provided for the edited target data in said third control means (9) at the output side for supplying the refresh channels (A, B, C, D), and an identical, second buffer memory (14) for the edited, console-associated data as well as background information data is provided in said third control means at said output side, said first and second buffer memories preventing one and the same refresh channel from being simultaneously supplied by, first, target data allocated to this channel and, second, console-associated data or, respectively, background information data and make it possible that data editing in said first and second arithmetic logic units (2, 3) is not blocked.

6. A surveillance radar system according to claims 1 or 2, characterized in that alarm reports are directly forwarded to the respectively addressed console via a serial interface.

7. A surveillance radar system according to claims 1 or 2 characterized in that interface test data are transmitted back to said computer (4).

* * * * *